United States Patent Office

2,960,477
Patented Nov. 15, 1960

2,960,477

PREPARATION OF CATALYSTS

William C. Smith, Houston, Tex., and Charles A. McMurray, Concord, and Walter L. Holmes, San Pedro, Calif., assignors to Shell Oil Company, a corporation of Delaware No Drawing. Filed Apr. 4, 1958, Ser. No. 726,315

10 Claims. (Cl. 252—435)

This invention relates to an improved catalyst for the hydration of unsaturated hydrocarbons in vapor phase. The invention also relates to a method for preparing the novel catalyst, and to an improved method for carrying out the vapor-phase hydration of olefins to yield alcohols employing the novel catalyst.

It is known that olefins can be reacted with water to form alcohols, the reaction being conducted in the vapor phase at high pressures and moderately elevated temperatures, and in the presence of a suitable catalyst. United States Patent No. 2,579,601, for example, teaches such a process wherein a composite catalyst comprising a solid porous siliceous support incompletely saturated with an aqueous solution of phosphoric acid of specified concentration is employed. This process, although successfully used in commercial operations, has been found to be not entirely satisfactory, for reasons which are attributable to the particular composite catalyst employed.

The requirements for a successful catalyst in the hydration of olefins include:

A. The catalyst must actively and selectively promote the hydration of olefins to alcohols without causing concurrent formation of excessive amounts of polymers, tars and cokes, or malodorous by-products, such as aldehydes;

B. The catalyst must have a sufficiently long life with respect to its catalytic activity.

C. The catalyst must be sufficiently strong mechanically to withstand crushing and other forces tending to cause its attrition during preparation and use.

D. The catalyst must be chemically stable and inert with respect to the various reactants and reaction products, as well as to the materials of construction with which it comes into contact.

It has been found that the particular material employed as the carrier determines the character of the final composite catalyst with respect to factors C. and D., above, and determines to a great extent factors A. and B., as well.

Only a relatively few materials have been found to provide all of the above requirements to a practical degree, and even in these cases there has been need for improvement. Composite catalysts comprising silica gel as the carrier have been found to exhibit high activity levels with good selectivity, but have low mechanical strength and insufficient resistance to attritional forces. Other types of siliceous materials, various aluminas, cokes and other forms of carbon have been employed as the carrier material with varying degree of success. The most useful of all of the carrier materials heretofore employed have been found to be certain forms of calcined diatomaceous earth. These calcined diatomaceous earths are composed primarily of silica and/or hydrated silica in the form of complete or incomplete diatom skeletons, the diatom skeletons being cemented or bound together with clay or clay-like materials. Catalysts prepared by impregnating these materials with phosphoric acid of the correct concentration have been found to have satisfactory activity levels, good selectivity and high mechanical strength.

Calcined diatomaceous earth materials of this kind have not proven entirely satisfactory for use as the carrier, however, for several reasons. The clay binding material contains metallic compounds (primarily iron and aluminum oxides and/or silicates) which have proven to be quite soluble in phosphoric acid of the concentration employed in olefin hydration catalysts, at the temperatures normally employed in effecting such hydrations. The solubility of these components of the binding material of the carrier in the impregnating acid causes several serious problems during the use of the corresponding composite catalysts. First, the alteration of the chemical composition of the binding material reduces its effectiveness as a binder, and seriously impairs the mechanical strength of the final catalyst. Both the mechanical strength of the catalyst and its resistance to abrasion are affected, so that during operation, it tends to disintegrate at an undesirably rapid rate. This breakdown of the catalyst increases the pressure drop across the catalyst bed and tends to cause the gaseous reaction mixture to channel—i.e., the bed tends to plug up, leaving only restricted paths through which the gases may flow. This reduces the effective area of the catalyst and the intimacy of contact between the gases and the catalyst surface; the efficiency of the catalyst is lowered accordingly. A further difficulty encountered is that the finer particles of the catalyst tend to disperse in the gaseous reaction mixture and pass with it from the reactor into subsequent process equipment. This causes additional loss of catalyst and necessitates clean-up of the other equipment. The over-all result is that both the useful life and the efficiency of the catalyst are reduced at an undesirably rapid rate.

Secondly, these composite catalysts have a tendency to "bleed" during use. That is to say, a liquid or semi-liquid material tends to seep from the catalyst. This seepage material appears to consist primarily of an aqueous solution of free phosphoric acid containing a substantial concentration of the phosphates of iron and aluminum. It tends to flow slowly through the catalyst bed and in part, at least, out of the reactor. A part of the fine particles produced by disintegration of the carrier material, together with particles of carbonaceous material formed by cracking of the olefin, becomes suspended in the seepage material. The fluidity of the resulting mixture is markedly dependent upon the temperature of the mixture, so that even a relatively small drop in the temperature of the mixture causes it to set to a hard, extremely tenacious solid. Thus, where the mixture passing through the catalyst bed encounters any "cool" zone, or where the reactor temperature falls more than a few degrees, the seepage material hardens, effectively plugging up the catalyst bed. The area of plugging often grows since the original plug disturbs the flow pattern of the gases, extending the area of the cool zone. This effect likewise reduces the efficiency of the catalyst, increases the pressure drop across the catalyst bed and causes channeling of the gaseous reaction mixture. In many instances, plugging of the reactor may become so severe that it is necessary to shut down the entire reactor and to replace the catalyst long before such would be required otherwise.

The seepage material flowing from the reactor into the subsequent process equipment causes similar difficulties. For example, the effluent gases from the reactor normally pass through pipes, valves, etc., to a heat exchanger wherein the product alcohol is condensed. The temperature in such piping usually is somewhat below the temperature in the reactor and the effluent gases are cooled substantially in the heat exchanger. Consequently, the seepage material deposits out, coating the inner surfaces of the piping and heat exchanger. At the least, such deposits increase the pressure drop across such apparatus, and seriously reduce the heat transfer coefficient of the heat exchanger, requiring frequent cleaning of this equipment; in many cases, replacement of much of the process equipment immediately downstream from the reactor has been found necessary.

A further disadvantage of these composite catalysts lies in the fact that hydration of the olefin over such catalysts is accompanied by the production of substantial amounts of carbonaceous materials. It is thought that these materials are formed by the cracking of the olefin reactant, and further that the cracking reaction is promoted by the iron present in the catalyst. Reduction of the iron content of the carrier thus would be highly desirable, provided that such could be accomplished without concurrent reduction in the mechanical strength of the carrier.

It has now been discovered that these difficulties can be overcome by the use of a new catalyst prepared by impregnating an aqueous solution of phosphoric acid containing a controlled concentration of $H_3PO_4$ upon carrier consisting of a modified calcined porous diatomaceous earth material prepared in a particular manner. By the use of this new catalyst, the olefin may be converted to the corresponding alcohol at significantly higher initial and average conversion levels than have been possible heretofore. The formation of malodorous by-products and/or tarry or carbonaceous materials is substantially reduced. Substantially no seepage of metallic phosphates occurs, so that on-stream periods may be prolonged indefinitely without significant reduction in heat transfer coefficients of downstream heat exchangers or increase in pressure drop of subsequent transfer equipment. No significant change in the mechanical strength of the new catalyst with prolonged use has been noted.

Throughout this specification, the activity of the catalyst will be expressed in terms of the mole fraction (percent) of olefin converted per pass to the alcohol. Thus, where the term "catalyst activity level" or, simply, "activity level" is used, this term expresses the mole percent of olefin converted to alcohol per pass through the reaction zone by means of the particular catalyst considered.

The new catalyst comprises an aqueous solution of phosphoric acid supported upon a carrier material consisting of a modified diatomaceous earth material. This carrier material is composed of a porous siliceous structure believed to consist primarily of the complete and/or incomplete skeletons of diatoms fused and/or cemented together by a modified ceramic clay binding material. The preferred carriers of this type have an average pore radius of from about 200 A. to about 6500 A. and at least 5% of pores having a radius of less than about 500 A. The total porosity of these carriers (measured as the number of cubic centimeters of distilled water absorbed per gram of the carrier material at ordinary temperatures and pressures) lies in the range of from about 0.6 to about 1.1 cubic centimeters per gram. The surface area of these carriers is from about 5 to about 20 square meters per gram.

The carrier material having the required properties is prepared by impregnating a calcined diatomaceous earth material of a kind described hereinafter in detail to saturation with a strong aqueous solution of phosphoric acid, heating (calcining) the impregnated carrier material in an atmosphere containing a controlled substantial amount of water vapor, and digesting the calcined carrier material with controlled amounts of hot water under conditions of controlled acidity.

The new, highly effective olefin hydration catalysts provided by this invention are prepared by impregnating the digested modified carrier material with phosphoric acid. The impregnation is conducted in such a manner that the concentration of $H_3PO_4$ in the aqueous solution of phosphoric acid impregnated upon the carrier material is at least 70% by weight under actual on-stream operation in the hydration of olefins. Preferably, the impregnation is conducted so that the on-stream catalyst contains aqueous phosphoric acid solution of from about 75% to about 95% by weight $H_3PO_4$.

The impregnation is conducted by simply soaking the modified carrier material in an aqueous solution of phosphoric acid of such strength that the necessary $H_3PO_4$ concentration results when the catalyst has reached equilibrium on stream. In many cases, the digested carrier material resulting from the process described hereinbefore may be directly impregnated, as by soaking that material one or more times in aqueous phosphoric acid of the requisite strength. In many other cases, however, it may be found desirable to first remove a part, or substantially all, of the water used to digest the calcined carrier material which has been retained by the digested carrier material, and then impregnate the dried carrier material with the aqueous phosphoric acid. The amount of the aqueous solution of phosphoric acid impregnated upon the carrier material should be such that the pore loading of the carrier material does not exceed about 90% and preferably lies somewhat below about 80%—i.e., 60%–80%. The term "pore loading" indicates the relationship between the actual amount of acid impregnated upon the carrier material and the maximum amount of acid which can be impregnated thereon, the carrier material and the acid being in the same physical states that they would be in under actual operating conditions. The maximum pore loading may be determined experimentally, but for many purposes, it is more convenient and sufficiently accurate merely to calculate the maximum pore loading from the total porosity of the carrier and the specific gravity of the acid solution. For these calculations, the porosity of the carrier and the concentration of $H_3PO_4$ in the acid solution have the same values that they have under actual operating conditions.

The material employed as the raw carrier material for preparing the novel catalysts may be any of the various calcined diatomaceous earth materials, by which term is meant any predominantly siliceous material composed primarily of the silica and/or hydrated silica skeletons of diatoms which are bonded together by a clay-like binding agent, which materials may be formed into particles of regular size and shape having high mechanical strength. These carrier materials are generically defined by the term "porous calcined ceramically bonded aggregates of diatom skeletons" resulting from the calcination of a material comprising essentially the skeletons of diatoms in intimate admixture with a minor amount, relative to the weight thereof, of clay. Typical of these materials are the calcined diatomaceous earths manufactured by the Johns-Manville Corporation and marketed under the trade name "Celite." Especially desirable of this class of materials is the grade thereof designated "Celite VIII," which is in the form of small pellets and has the composition:

| Component: | Weight percent |
|---|---|
| Silica | 86.1 |
| Iron oxide | 2.4 |
| Alumina | 7.3 |
| Magnesia | 1.2 |
| Sodium oxide+potassium oxide | 2.2 |
| Titanium dioxide | 0.2 |
| Remainder | 0.6 |

It is preferred that the carrier material be in granular or pelleted form, and that the least dimension of said granules or pellets be at least about 1/32 of an inch.

To prepare the catalyst, the untreated material is first impregnated to substantial saturation thereof with an aqueous solution of phosphoric acid containing a high concentration of the acid. For this purpose, there may be employed any aqueous solution of phosphoric acid containing more than about 70% by weight of phosphoric acid. Convenient sources of suitable acid solutions are those commercially available, which contain approximately 75-85% by weight phosphoric acid. The impregnation of the carrier may be effected in any manner which will result in substantial saturation of the carrier with the acid. The impregnation may be conveniently effected by immersing the carrier material in the acid and allowing it to soak for a sufficient time to insure saturation of the material. In the usual case, a soaking period of from about ½ to about 1 hour will be sufficient for this purpose. The impregnated carrier is then freed of excess acid by allowing the carrier to drain thoroughly.

The drained impregnated carrier material is calcined under carefully controlled and correlated conditions of temperature and humidity, to effect solution of substantially all of the components of the clay-binding material and to effect solution of a controlled amount of the siliceous diatom skeletons. The calcination may be effected at any temperature within the range of from about 150° C. to about 400° C.—temperatures of from about 225° C. to about 325° C. being preferred—providing the atmosphere in which the calcination is carried out contains an amount of water vapor sufficient to give a substantial partial pressure not exceeding the partial pressure of water vapor in equilibrium with an aqueous solution of phosphoric acid at the calcination temperature. Thus, when the calcination is conducted within the specified temperature range the atmosphere in which the calcination is conducted must contain water vapor in an amount such that the partial pressure of water vapor in that atmosphere lies within the range of from about 50 to about 400 millimeters of mercury. It has been found that a catalyst prepared from a carrier material calcined within the stated temperature range in the presence of a partial pressure of water of about 150-300 millimeters of mercury possesses optimum properties—i.e., this catalyst promotes conversion of olefins to alcohols at consistently high conversion levels, has excellent mechanical strength and exhibits substantially no seepage of metallic phosphates. The catalyst prepared according to this procedure contains but a small amount of iron and aluminum compounds. In the usual case, the iron content (as iron oxide) is less than about 0.3% by weight of the carrier material, and the aluminum content (as the oxide) is somewhat less than about 3.0%. The form and location of these compounds in the carrier material are such that the compounds react with the impregnating acid slowly or not at all, under the usual operating conditions. The concentration and availability of the iron are such that cracking of the olefin is not promoted; the amount of carbonaceous materials produced is substantially reduced.

The total pressure on the system during the calcination is not a critical factor in the production of carriers of optimum characteristics, and atmospheric, subatmospheric or superatmospheric pressures are all satisfactory, provided the required humidity relationships are maintained.

The time required for calcination varies more or less directly with the temperature employed. For example, if the calcination is carried out at about 100° C., the effect of the phosphoric acid is incomplete, even after 50-60 hours of calcination, whereas if the temperature is maintained at about the middle portion of the permissible range—at from about 250° C. to about 350° C.—calcination for a period of from about 2 to about 8 hours will be found to effect the reaction between the carrier and the phosphoric acid to substantial completion. In one case the calcination was conducted at 300° C. and 200 millimeters of mercury partial pressure of water for 1 hour—the catalyst activity was about 4.5 units. In comparison, where the calcination was continued for 2 hours, the catalyst activity rose to about 5.1 units. Further heating did not improve the catalyst activity significantly. When the calcination is carried out at lower temperatures—i.e., 150° C. to 250° C.—somewhat longer periods of calcination—up to about 20 hours—will be required.

Following calcination, the impregnated carrier material is digested with a controlled amount of hot water having a controlled pH. It is essential to the formation of the modified carrier material having the desired properties that the impregnated carrier material be digested at least once with hot water having a pH of 2.5 or less. By "digestion" is meant that the carrier material is intimately mixed with the digesting liquid, and that intimate contact between the carrier material and the liquid is maintained for a sufficient period of time to allow penetration of the liquid into the pores of the carrier material, and thorough washing of the carrier material by the liquid. In many cases, the necessary digestion conditions are obtained by immersing the calcined, impregnated carrier material in a limited amount of hot water; in such cases, the necessary acidity is provided by the phosphoric acid impregnated on the carrier material which has not reacted with any component of the carrier material. In other cases, it may be found desirable to precede, or to follow, or to both precede and follow, water digestion of the calcined carrier material by digestion of the calcined carrier material with a solution of a strong inorganic acid in water. The inorganic acid is preferably sulfuric acid or phosphoric acid, since these acids are substantially nonvolatile. When a solution of phosphoric acid is used, that solution suitably and conveniently is the remainder of the solution used in the original impregnation of the carrier material.

At least 0.75 volume of digestion solution is used per volume of carrier material, and it is preferred, in order to obtain substantial complete removal of metallic phosphates, that at least one volume of digestion solution be used per volume of carrier material. Digestion solution-to-carrier material volume ratios of below about 0.75:1 are not employed because lower ratios promote the formation of thick gelatinous extracts of silica gel or silica gel from the silicyl phosphates which result from reaction of the phosphoric acid with part of the silica diatom skeletons of the carrier material.

The in situ pH of the digestion solution must be maintained at 2.5 or below, and desirably is maintained at less than about 1.0. Where an aqueous solution of inorganic acid is employed, the desired pH of the digestion solution in situ is maintained by using an acid solution having an initial pH of from about 0.2 to about 0.5. If the pH of the digestion solution in contact with the carrier material is not maintained within the stated limits, the iron and aluminum phosphates tend to hydrolyze and precipitate from the solution, coating the carrier material with a white crust which is very difficult to remove. This crust is highly undesirable, since it causes plugging of the pores of the carrier material, cementation of the particles of carrier material, and thus substantially reduces the usefulness of the treated carrier material in forming olefin hydration catalysts.

The digestion is effected by immersing the carrier material in the digestion liquid maintained at or slightly below the boiling point thereof, and maintaining the resulting mixture under those conditions for a sufficient time to insure substantially complete solution of the metallic phosphates in the carrier material. The temperature of the mixture should not lie below about 85° C., but it is desirable that vigorous boiling be avoided during the digestion to prevent attrition of the catalyst particles.

The digestion procedure should be carried out until the carrier material is substantially free of metallic phosphates. It is preferred that the digestion be carried out as a series of treatments using fresh digestion solutions in each case. In many cases, it is preferred that the last of such a series of treatments employ a solution of phosphoric acid as the digestion solution, since such a solution aids in removing any silicyl phosphates, silica sol or silica gel that may still be present, and also aids in reducing the amount of phosphoric acid that must be used in the solution of phosphoric acid used in the impregnation of the modified carrier. Where a series of digestions are used, the duration of each in general should be at least thirty minutes, and in some cases as much as an hour will be found desirable. In such a procedure, it will seldom be found desirable to digest the carrier material for more than about two hours in any one of the digestion stages.

Following the digestion, the calcined, digested carrier material is drained of the digestion solution. The drained catalyst itself may be impregnated with aqueous phosphoric acid solution to give the final catalyst, or the drained catalyst may be dried first, and the dried catalyst impregnated with the aqueous phosphoric acid solution.

Where the drained, digested carrier material is dried before final impregnation, the drying may be effected by any means common to the art—oven drying or drying with a hot dry gas, or similar means may be employed. The drying may be partial, or substantially all of the free water in the carrier material may be removed.

The impregnation of the modified carrier material is carried out in the same manner as heretofore described in preparing the carrier material for the calcination treatment—i.e., the modified carrier material is soaked in the aqueous phosphoric acid solution for a sufficient period of time to allow the carrier material to become saturated with the acid, the excess acid is removed and the carrier material allowed to drain to dryness. Where the drained digested carrier material is used, the carrier material will contain water, or a dilute acid solution. In such cases, in order to provide the necessary $H_3PO_4$ concentration in the final on stream catalyst, it may be necessary to impregnate the drained carrier material more than once. Such repeated impregnation is often conveniently avoided by partially or fully drying the drained catalyst before it is impregnated. Such repeated impregnation may also be avoided by employing very strong aqueous phosphoric acid as the impregnating acid.

The composite catalyst comprises a solution of phosphoric acid impregnated upon the modified carrier material. In on-stream operation, the concentration of $H_3PO_4$ in the solution impregnated upon the carrier material must be at least 70% by weight and preferably is from about 75 to about 95% by weight. Further, the carrier material pore loading should not be above about 90% and should be about 60–80%. At these pore loadings catalyst activity is at its maximum and seepage is kept to a minimum. These conditions are most conveniently attained by saturating the carrier material (pore loading=100%) with a more dilute solution of phosphoric acid and operating the catalyst under such conditions that part of the water in the solution is removed, bringing the concentration of $H_3PO_4$ and the pore loading to the desired levels simultaneously. For this purpose, the dilute acid used to impregnate the carrier material preferably initially contains somewhat less than 80% $H_3PO_4$ by weight. The acid concentration should not be below about 50% by weight, for otherwise the final composite catalyst will be incompletely saturated with the acid. In general, an acid strength of about 55 to 75% by weight has been found most suitable.

It has been found that catalysts of this invention having optimum activity for hydration of olefins are prepared by the following procedure, which is one, and a preferred, aspect of the process of the invention:

(1) The calcined diatomaceous earth carrier material is impregnated to saturation with a strong aqueous solution of phosphoric acid, as set out hereinbefore;

(2) The impregnated carrier material is heated in an atmosphere containing a controlled amount of water vapor, as set out hereinbefore;

(3) The calcined carrier material is digested with controlled amounts of hot water under conditions of controlled acidity, as follows:
  (a) The carrier material is digested with controlled amounts of hot water having a pH less than about 1.0;
  (b) The digested carrier material is drained and is further digested with controlled amounts of fresh hot water.

(4) The treated carrier material is dried and is then impregnated to saturation with an aqueous solution of phosphoric acid of specified concentration, as set out hereinbefore.

The carrier materials prepared by this procedure appear to consist primarily of the complete or incomplete solutions of diatoms fused and/or cemented together, and having impregnated or deposited on the surface of said skeletal structure a more or less uniform, adherent deposit of silica gel. Ordinarily not more than about 25% of the total weight of the silica and at least about 1% is in the form of silica gel, the remainder being in the form of complete or incomplete diatom skeletons. The silica gel usually is present in the form of a substantially uniform layer not over about 1500 A. in thickness over the surface of the diatom skeleton structure, the layer intimately contacting the major portion of the surface area of said structure. Carirers in which the thickness of the layer of silica gel lies in the range of from about 10 to about 250 A., can be used to prepare olefin hydration catalysts of optimum activity.

The catalysts prepared according to this process have been found to be relatively insensitive to changes in the water content of the reaction zone, and, therefore, may be used directly in the process for hydrating the olefin without any preliminary treatment. When employed in the process for effecting hydration of the olefin hereinafter described, the catalyst loses water until the strength of the phosphoric acid impregnated upon the carrier rises until the solution of the acid contains at least about 70% by weight phosphoric acid, which level is maintained throughout the duration of the reaction.

Olefins may be directly hydrated to the corresponding alcohols at substantially higher conversion levels than have heretofore been possible by passing a gaseous mixture of the olefin and water vapor maintained at elevated temperatures, the pressure being likewise moderately elevated. By the use of this new catalyst, the olefin conversion level is much higher than that previously obtainable, and while the conversion level may decline with time, the rate of decline is much lower than with similar catalysts known in the art.

In effecting the hydration of the olefin, the various process conditions—i.e., temperature, pressure and molar ratio of water vapor to ethylene vapor in the feed—are adjusted so as to bring the concentration of acid in the aqueous solution of acid impregnated upon the carrier to a strength of at least 70% by weight as soon as possible after the process has gone on stream, and also following the addition of fresh acid during the hydration process.

The process is started up and placed on stream by passing a heated gas through the catalyst bed until the reaction temperature is approached, at which time the feed mixture of olefin and water vapors is passed through the bed and the product separated. It is not necessary, during the start-up period, that there be any water vapor in the gas passing through the catalyst bed; however, the presence of water vapor in the gas will not be objectionable, provided that the partial pressure of such water vapor does not exceed the vapor pressure of water over an aqueous solution of phosphoric acid of the strength with which the carrier was impregnated, at the temperature employed. If the partial pressure of water exceeds this limit, dilution of the acid will occur, leading to seepage of acid from the carrier material, and consequent corrosion and plugging of equipment. When placed on stream according to this process, seepage of acid is minimized and optimum conversion levels are maintained. It should be noted that the indifference of the new catalyst to start up procedures in which no water is present constitutes a distinct advantage. Heretofore, the presence of water in the atmosphere surrounding the catalyst during the start-up period has been mandatory; where near-anhydrous conditions have been used, the efficiency of the composite catalyst has been substantially and permanently reduced. Special facilities for maintaining the desired humidity conditions during start-up periods have been required. The new catalyst demands no such procedure, thus simplifying the over-all hydration process greatly.

The temperature of the catalyst bed should be maintained within the range of from about 250° C. to about 350° C., and preferably within the range of from about 265° C. to about 300° C. The catalyst bed temperature should not be allowed to rise above about 350° C., for at temperatures above this limit the over-all efficiency of the process falls off substantially, the conversion of the olefin to the alcohol per pass through the catalyst being reduced, and also a substantial portion of the olefin being either converted into a polymer thereof, or into products of an undesirable nature which, along with the polymer, are difficult to separate from the alcohol and which reduce the over-all yield of alcohol obtainable. If temperatures below about 250° C. are employed, the conversion level again falls off and becomes impractically low.

The total pressure within the reaction system should be at least 500 p.s.i.g., the maximum pressure being determined primarily by the limitations of the equipment used. It may be desirable in some cases to employ pressures of up to 5000 p.s.i.g., but in the usual case, pressures within the range of from about 750 to about 1250 p.s.i.g. will be found most satisfactory.

The mole ratio of water vapor to olefin vapor should lie within the range of from about 0.3 to about 1.0, and preferably within the range of from about 0.4 to about 0.7.

The rate at which the feed gases are passed through the catalyst bed is not critical, preferred practice requiring that the VSVM of the system lie between about 20 and about 50. By the symbol VSVM is means the "vapor space velocity perminute," which is determined in any particular case by dividing the volume of gas fed (cubic feet) per minute (at standard temperature (25° C.) and pressure (760 mm. Hg)) by the bulk volume of the catalyst (cubic feet). Water vapor or other condensible gases are considered as non-condensible for calculation of the VSVM of the system.

When the catalyst is prepared in the manner described, and the hydration of the olefin is carried out as indicated, it will be found that the olefin will be converted to the alcohol in substantially higher amounts than have been heretofore obtainable, with no seepage of metallic phosphates. Further, it will be found that under these conditions the catalyst is stable, the carrier being substantially inert with respect to the acid solution impregnated upon it. Thus, it will normally be found unnecessary, in order to maintain catalyst activity levels, to add more than minor amounts of phosphoric acid during subsequent operation. The fresh acid may be added in either a continuous or intermittent manner, the amount of acid and the rate of its addition being controlled so as to prevent seepage of acid from the catalyst bed. The acid added during operation is preferably an aqueous solution thereof. The concentration of $H_3PO_4$ in such makeup acid is not critical.

The olefins employed as the feed stock in the process may be derived from any convenient source, such as the thermal or catalytic cracking of petroleum hydrocarbons. Normally, mixtures of the olefins with other hydrocarbon gases may be employed. It is preferred that the other components of such mixtures be compounds which are substantially inert to the action of water vapor in the presence of the catalyst.

The alcohol produced by the hydration of the olefin is recovered from the gaseous effluent emerging from the catalyst bed by passing said effluent through a suitable condensing device wherein the alcohol and water vapor present are converted to the liquid form. By a proper choice of condenser and condensing temperature, the product alcohol and water vapor can be condensed with the condensation of but a minor amount of the ether formed. For example, in the usual case the condensation is carried out in such a way that only about 5 or 10% of the ether formed is removed with the liquid alcohol product. The gaseous ether, together with unreacted gaseous olefin, is recycled through the system for admixture of additional quantities of olefin and water vapor, the process thereby being carried on in a continuous manner. The ether contained in the alcohol product may be removed therefrom by methods that are known in the art—conveniently by distillation.

The following examples will serve to illustrate the manner in which the present invention finds application.

*Example I*

A composite catalyst comprising phosphoric acid impregnated upon a siliceous carrier was prepared according to the following procedure:

100 parts of a pelleted diatomaceous earth material designated by the manufacturer (Johns-Mansville Corporation) as "Celite VIII," each pellet of which has a generally cylindrical shape and measures approximately 5/32 by 3/16 inch, were soaked for approximately one hour, and at room temperature, in an excess of an aqueous solution of phosphoric acid containing 85% by weight $H_3PO_4$. The excess acid was then removed by allowing the carrier material to drain for 1 hour. The impregnated carrier material was then placed in an oven and heated at 300° C. for 3 hours, the pressure being atmospheric, and the atmosphere surrounding the carrier material containing a partial pressure of water equal to approximately 200 millimeters of mercury. The material was then cooled and leached by digesting the material for 1 hour with acidified water maintained at 100° C. The water had an initial pH of 0.35, the acidity being furnished by the addition of sulfuric acid. The volume ratio of water to carrier material was approximately 1.5. The carrier material was then drained and the leaching repeated in an identical manner, using a fresh portion of acidified water.

The acidified water was then drained from the material and the leaching repeated twice more, following the same procedure, but substituting pure water for the acidified water.

The carrier material was drained, and dried in an oven at about 125° C. It was then soaked in an excess of an aqueous solution of phosphoric acid containing 55% by weight of $H_3PO_4$, for approximately one hour, and was then drained for about 2 hours.

*Example II*

200 parts of the catalyst prepared in Example I were charged to a reactor, and a gaseous mixture comprising water vapor and ethylene vapor in a molar ratio of 0.5:1.0 was passed through the catalyst bed at the rate of 27 VSVM. The temperature of the catalyst bed was maintained within the range of 275° C. to 285° C. The total pressure was 1000 p.s.i.g. No phosphoric acid was added during the run. The initial conversion level of ethylene to ethyl alcohol was 5.3%. At the end of 400 hours of operation the conversion level was 4.8%. Inspection of the catalyst during and at the end of the run showed that no carbon deposit or fines resulted. Comparison of the catalyst's physical strength before and after the run showed a negligible physical strength loss.

A duplicate run was conducted, substituting for the catalyst specified above, a composite catalyst comprising Celite VIII as received from the manufacturer impregnated with an aqueous solution of phosphoric acid of the concentration employed with the treated carrier. The initial conversion level in this run was 4.2%, and the final conversion level was about 3.6%.

*Example III*

The modified Celite VIII-phosphoric acid catalyst employed in Example II was reimpregnated with an aqueous solution of phosphoric acid containing 55% by weight $H_3PO_4$, and again was employed in the hydration of ethylene under the same conditions indicated in Example II. The conversion level remained at 5.5% throughout the duration of a 30-hour run. This value may be compared to the value 5.3% obtained at the end of the first 30 hours of the run reported in Example II. During this 30-hour period of continuous operation, there is no observed decline in activity of the reimpregnated catalyst.

*Example IV*

The effect of low humidity conditions was investigated inasmuch as catalysts prepared according to the prior art method exhibited a significant decline in catalyst efficiency when the humidity of the feed material was allowed to become unduly low. 200 parts of the catalyst prepared in Example I was charged to a reactor and heated in a stream of nitrogen for one hour, the catalyst bed temperature being approximately 275° C., and the total pressure being 1000 p.s.i.g. The water vapor-ethylene vapor feed mixture in molar ratio of 0.5:1 was then fed into the reactor. The activity of the catalyst after this treatment was 4.8, the catalyst bed temperature being approximately 275° C., and the feed rate being 47 VSVM. The run was repeated with 200 parts of fresh catalyst which was not subjected to the pretreatment. The activity level of this catalyst was substantially the same as that of the pretreated catalyst, i.e., approximately 4.6% total conversion.

*Example V*

The optimum operating temperature for the catalyst prepared according to the procedure of Example I was determined by a series of runs at varying catalyst bed temperatures. The conditions, other than the temperature, were identical to those in Example II. The following results were obtained:

| Run | Temperature (° C) | Ethylene Conversion Level |
|---|---|---|
| 1 | 250 | 4.7 |
| 2 | 275 | 5.4 |
| 3 | 300 | 4.5 |

*Example VI*

A run of extended duration was made, the on-stream time being 100 days, the condition being substantially those of Example II. The following data were obtained:

| | Initial (Start of Run) | | Final (End of Run) | |
|---|---|---|---|---|
| | Parts Product per Day | Conversion Level | Parts Product per Day | Conversion Level |
| Untreated Catalyst | 14.5–15.5 | 4.2–4.6 | 10 | 3.2 |
| Treated Catalyst | 16.5 | 5.3 | 15.5 | 4.6 |

This data, which is illustrative of typical data obtained in large-scale operation for extended periods, demonstrates that the initial level at which ethylene is converted to ethyl alcohol employing the catalyst of this invention is approximately 20% greater than when the prior art catalyst is used, while the final level of conversion using the catalyst of this invention is more than 40% more than when the prior art catalyst is used.

Comparison of the results obtained from preparation of ethyl alcohol using the catalyst and process of the prior art (hereinafter designated for brevity and convenience as Method "A"), as typified by United States Patent No. 2,579,601, and the results obtained from preparation of ethyl alcohol using the catalyst and process illustrated in Examples I through VI (hereinafter designated as Method "B"), establishes the following advantages for Method "B":

a. The conversion level obtained by Method "B" has been substantially constant throughout the duration of the use of the process (376 stream days) while the conversion level obtained by Method "A" constantly falls, so that complete reimpregnation of the carrier with fresh acid is required after aproximately 180–200 stream days of operation. Moreover, the conversion levels obtained with the reimpregnated carrier likewise constantly fall, requiring further complete reimpregnation of the carrier with fresh acid after a further 180–200 stream days of operation.

b. Method "B" permits conducting the hydration of ethylene at temperatures about 10° C. lower than does Method "A." Method "B" thus permits operation at a temperature where equilibrium relations are more favorable to the formation of a larger proportion of ethylene to ethyl alcohol. In Method "B," the equilibrium conversion level of ethylene to ethyl alcohol is more closely approached (actual conversions being approximately 85% of equilibrium level) than in Method "A" (actual conversions being approximately 78% of equilibrium level).

c. By operating under conditions conducive to optimum conversion levels, Method "B" results in an increase of 22.6% in the amount of ethyl alcohol made per reactor per stream day over the amount which is produced by Method "A" under optimum conditions.

d. The utility costs of Method "B" are approximately 20% per unit of ethanol made below those of Method "A," because of increased total conversion.

e. No fines are produced in Method "B," whereas in Method "A," a substantial amount of fines results. In Method "B," but minor amounts of carbon are formed whereas in Method "A" a substantial amount of carbon is formed.

f. The catalyst of Method "B" has an indefinite life, showing little loss of activity at the end of 376 stream days, while the average life of the catalyst of Method "A" is about 180–200 stream days.

g. The catalyst of Method "B" shows little decline in mechanical strength and resistance to abrasion during operation whereas the mechanical strength of the catalyst of Method "A" declines significantly over a period of about 180–200 stream days.

h. As a result of the increased conversion of ethylene to ethyl alcohol resulting from Method "B," together with the reduced down-time necessary to maintain the hydration reaction at an optimum level in Method "B," on a calendar year basis Method "B" effects an approximately 30% increase in the amount of ethyl alcohol possible by Method "A."

*Example VII*

At ambient temperature approximately 400 parts by weight of Celite VIII (described in Example I) were immersed in an excess of 75% by weight phosphoric acid solution for 1 hour. The excess acid was then drained off. This procedure was repeated twice more, using the remainder of the same phosphoric acid solution. The drained acid contained approximately 72.5% by weight phosphoric acid.

The impregnated carrier material was then dried at 300° F. with a hot dry inert gas. The dried impregnated carrier material was then heated to 550° F. at 600 pounds per square inch gauge pressure by a hot inert gas containing a partial pressure of water vapor of 10,350 millimeters mercury pressure. These conditions were maintained for 8 hours.

The carrier material was then cooled to a uniform temperature of 200–210° F. and the pressure was reduced to atmospheric.

The calcined carrier material then was immersed in approximately an equal volume of fresh water, and was then drained immediately. This procedure was repeated twice more with the same amounts of fresh water. The digestion solution drained off in each case had a pH of approximately 2.

The drained carrier material then was immersed three times in the 72.5% by weight phosphoric acid recovered from the original impregnation. The final concentration of acid drained from the carrier material was about 55% by weight phosphoric acid.

The carrier material then was immersed three times in about an equal volume of fresh 75% by weight phosphoric acid solution. The acid solution finally drained from the carrier material was approximately 60% by weight phosphoric acid.

The impregnated carrier material was then dried at 300° F. by a hot inert gas, and was brought on stream as indicated in Example II. The initial conversion level of ethylene to ethyl alcohol was 5.2%. At the end of 172 days operation, the conversion level was 4.4% and at the end of 280 days operation was 4.0%.

*Example VIII*

A composite catalyst was prepared by the procedure of Example VII, with the exception that the calcination was conducted for 16 hours at a temperature of 570° F., and the gas stream contained a partial pressure of water vapor of 3410 millimeters mercury, and the exception that the calcined catalyst was immersed in fresh water four times, rather than three. The catalyst activity was comparable to that of the catalyst of Example VII.

*Example IX*

A composite catalyst was prepared by the procedure of Example VII, with the exception that the calcination was conducted for 8 hours at 570° F. in a gas stream containing a partial pressure of water vapor of about 197 millimeters mercury, and the exception that the calcined catalyst was immersed in fresh water five times, rather than three. The catalyst activity was comparable to that of the catalyst of Example VII.

This application is a continuation-in-part of our copending application Serial No. 476,054 filed December 17, 1954, and now abandoned.

We claim as our invention:

1. A process for the production of a composite catalyst comprising an aqueous solution of phosphoric acid impregnated upon a porous siliceous carrier material, said process comprising:

a. saturating a carrier material consisting of a porous ceramically bonded aggregate of diatom skeletons resulting from the calcination of a material comprising essentially the skeletons of diatoms in intimate admixture with a minor amount, relative to the weight thereof, of clay, with a solution of phosphoric acid containing at least 70% by weight of $H_3PO_4$;

b. heating the resulting phosphoric acid-saturated carrier material at a temperature of from about 150° C. to about 400° C. in an atmosphere containing water vapor sufficient in amount that the partial pressure of water vapor in said atmosphere is at least 50 millimeters mercury, but is less than the partial pressure of water vapor in an atmosphere in equilibrium with the aqueous solution of phosphoric acid mentioned in step $a$ at the temperature at which said heating is effected;

c. digesting the resulting heated phosphoric acid-saturated carrier material in at least three-quarters of its volume of water having a pH of 2.5 or less;

d. impregnating the resulting digested carrier material with an aqueous solution of phosphoric acid containing at least 50% by weight of $H_3PO_4$.

2. A composite catalyst comprising an aqueous solution of phosphoric acid supported upon a porous siliceous carrier material, said catalyst being obtained by the successive steps of:

a. saturating a carrier material consisting of a porous ceramically bonded aggregate of diatom skeletons resulting from the calcination of a material comprising essentially the skeletons of diatoms in intimate admixture with a minor amount, relative to the weight thereof, of clay, with a solution of phosphoric acid containing at least 70% by weight of $H_3PO_4$;

b. heating the resulting phosphoric acid-saturated carrier material at a temperature of from about 150° C. to about 400° C. in an amosphere containing water vapor sufficient in amount that the partial pressure of water vapor in said atmosphere is at least 50 millimeters mercury, but is less than the partial pressure of water vapor in an atmospherein equilibrium with the aqueous solution of phosphoric acid mentioned in step $a$ at the temperature at which said heating is effected;

c. digesting the resulting heated phosphoric acid-saturated carrier material in at least three-quarters of its volume of water having a pH of 2.5 or less;

d. impregnating the resulting digested carrier material with an aqueous solution of phosphoric acid containing at least 50% by weight of $H_3PO_4$.

3. A process for the production of a composite catalyst comprising an aqueous solution of phosphoric acid impregnated upon a porous siliceous carrier material, said process comprising:

a. saturating a carrier material consisting of a porous ceramically bonded aggregate of diatom skeletons resulting from the calcination of a material comprising essentially the skeletons of diatoms in intimate admixture with a minor amount, relative to the weight thereof, of clay, with a solution of phosphoric acid containing at least 70% by weight of $H_3PO_4$;

b. draining the excess of said solution of phosphoric acidfrom said carrier material;

c. heating the resulting drained impregnated carrier material at a temperature of from about 150° C. to about 400° C. in an atmosphere containing water vapor sufficient in amount that the partial pressure of water vapor in said atmosphere is at least 50 millimeters of mercury, but is less than the partial pressure of water vapor in an atmosphere in equilibrium with the aqueous solution of phosphoric acid mentioned in step $a$ at the temperature at which said heating is effected.

d. digesting the resulting heated impregnated carrier material in at least three-quarters of its volume of water having a pH of less than about 1.0.

e. further digesting the resulting carrier material in fresh-non-acidified water.

f. drying the resulting digested carrier material, and g. impregnating the resulting dried carrier material with an aqueous solution of phosphoric acid containing at least 50% by weight of $H_3PO_4$.

4. The catalyst resulting from the process of claim 3.

5. A process for the production of a composite catalyst comprising an aqueous solution of phosphoric acid impregnated upon a porous siliceous carrier material, said process comprising:

a. saturating a carrier material consisting of a porous ceramically bonded aggregate of diatom skeletons resulting from the calcination of a material comprising essentially the skeletons of diatoms in intimate admixture with a minor amount, relative to the weight thereof, of clay, with a solution of phosphoric acid containing at least 70% by weight of $H_3PO_4$, b. draining the excess of said solution of phosphoric acid from said carrier material, c. heating the resulting drained impregnated carrier material at a temperature of from about 150° C. to about 400° C. in an atmosphere containing water vapor sufficient in amount that the partial pressure of water vapor in said atmosphere is from about 50 to about 400 millimeters of mercury, d. digesting the resulting heated impregnated carrier material in at least an equal volume of water having a pH of less than about 1.0, e. further digesting the resulting carrier material in fresh non-acidified water, f. drying the resulting digested carrier material, and g. impregnating the resulting dried carrier material with an aqueous solution of phosphoric acid containing at least 50% by weight of $H_3PO_4$.

6. The catalyst resulting from the process of claim 5.

7. A process according to claim 1 wherein the acid water set out in step c thereof is obtained by immersing the carrier material product of step b thereof in essentially pure water.

8. A process for the production of a composite catalyst comprising an aqueous solution of phosphoric acid impregnated upon a porous siliceous carrier material, said process comprising:

a. saturating a carrier material consisting of a porous ceramically bonded aggregate of diatom skeletons resulting from the calcination of a material comprising essentially the skeletons of diatoms in intimate admixture with a minor amount, relative to the weight thereof, of clay, with a solution of phosphoric acid containing at least 70% by weight of $H_3PO_4$;

b. heating the resulting phosphoric acid-saturated carrier material at a temperature of from about 150° C. to about 400° C. in an atmosphere containing water vapor sufficient in amount that the partial pressure of water vapor in said atmosphere is at least 50 millimeters mercury, but is less than the partial pressure of water vapor in an atmosphere in equilibrium with the aqueous solution of phosphoric acid mentioned in step a at the temperature at which said heating is effected;

c. digesting the resulting heated phosphoric acid-saturated carrier material in at least three-quarters of its volume of water having a pH of 2.5 or less obtained by immersing said carrier material in essentially pure water;

d. digesting the resulting carrier material product in at least one further portion of water;

e. digesting the resulting water-digested carrier material product in at least three-quarters of its volume of an aqueous solution of a strong inorganic acid, said solution having a pH of 2.5 or less;

f. impregnating the resulting digested carrier material with an aqueous solution of phosphoric acid containing at least 50% by weight of $H_3PO_4$.

9. A process according to claim 8 wherein the digestions recited in steps c, d and e, and the impregnation recited in step f, thereof are all conducted without intervening drying of the carrier material.

10. The catalyst resulting from the process of claim 9, when the strong inorganic acid of step e thereof is phosphoric acid.

References Cited in the file of this patent
UNITED STATES PATENTS

| | | |
|---|---|---|
| 2,018,065 | Ipatieff | Oct. 22, 1935 |
| 2,496,621 | Deery | Feb. 7, 1950 |